US006728395B1

(12) United States Patent
Kage et al.

(10) Patent No.: US 6,728,395 B1
(45) Date of Patent: Apr. 27, 2004

(54) APPARATUS FOR INPUTTING INFORMATION AND COMPUTER PRODUCT

(75) Inventors: Hiroshi Kage, Tokyo (JP); Akihiro Takeda, Tokyo (JP); Shinji Komori, Tokyo (JP); Kazuo Kyuma, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 632 days.

(21) Appl. No.: 09/604,695

(22) Filed: Jun. 26, 2000

(30) Foreign Application Priority Data

Jan. 27, 2000 (JP) ........................... 2000-018665

(51) Int. Cl.[7] .................................................. G06K 9/00
(52) U.S. Cl. ......................................... 382/107; 345/157
(58) Field of Search ........................... 382/107; 73/488; 348/154, 155; 356/27; 345/157, 156, 158, 169, 467, 468, 469, 469.1, 470

(56) References Cited

U.S. PATENT DOCUMENTS 6,160,901 A * 12/2000 Kage ........................... 382/107
6,556,185 B2 * 4/2003 Rekimoto .................... 345/157

FOREIGN PATENT DOCUMENTS

| JP | 4-241077 | | 8/1992 |
| JP | 9-212281 | | 8/1997 |
| JP | 10-93358 | | 4/1998 |
| JP | 10-240945 | * | 9/1998 |
| JP | 11-212708 | | 8/1999 |
| JP | 11-305748 | | 11/1999 |

OTHER PUBLICATIONS

Kyuma et al,; "Artificial retinas —fast, versatile image processors", *Nature*, vol. 372, No. 6502, pp. 197–198, Nov. 10, 1994.

* cited by examiner

*Primary Examiner*—Samir Ahmed
(74) *Attorney, Agent, or Firm*—Leydig, Voit & Mayer, Ltd.

(57) ABSTRACT

An apparatus for inputting information includes an image input section which acquires the image information through an image sensor, a motion calculation section which calculates a distance of movement based on the image information, an information selection section which selects symbol information from a symbol table in operatively interlocked relation with the calculated distance of movement, and an information display section which displays the symbol table and the selected symbol information.

12 Claims, 15 Drawing Sheets

FIG.4A
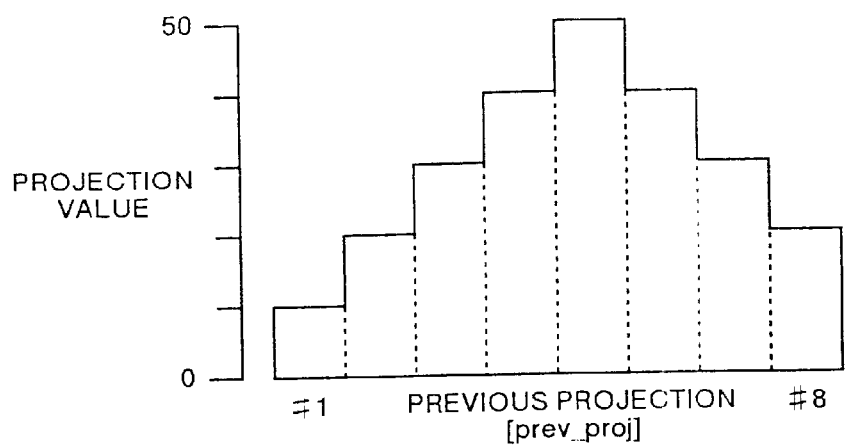
FIG.4B
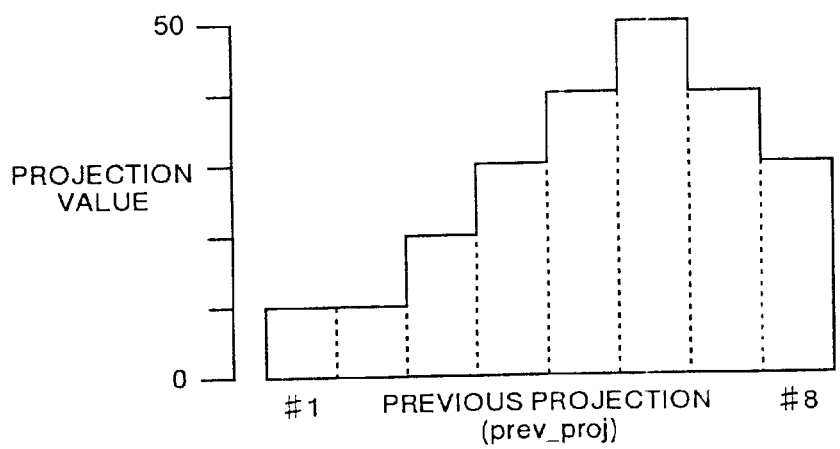
FIG.4C
| ELEMENTS OF ARRANGEMENT No. | #1 | #2 | #3 | #4 | #5 | #6 | #7 | #8 |
|---|---|---|---|---|---|---|---|---|
| PREVIOUS PROJECTION (prev_proj) | 10 | 20 | 30 | 40 | 50 | 40 | 30 | 20 |
| CURRENT PROJECTION (curr_proj) | 10 | 10 | 20 | 30 | 40 | 50 | 40 | 30 |
| DIFFERENCE PROJECTION (diff_proj) | 0 | -10 | -10 | -10 | 10 | 10 | 10 | 10 |
| ESTIMATED DIRECTION (vect_proj) |  | → | → | → |  | → | → |  |

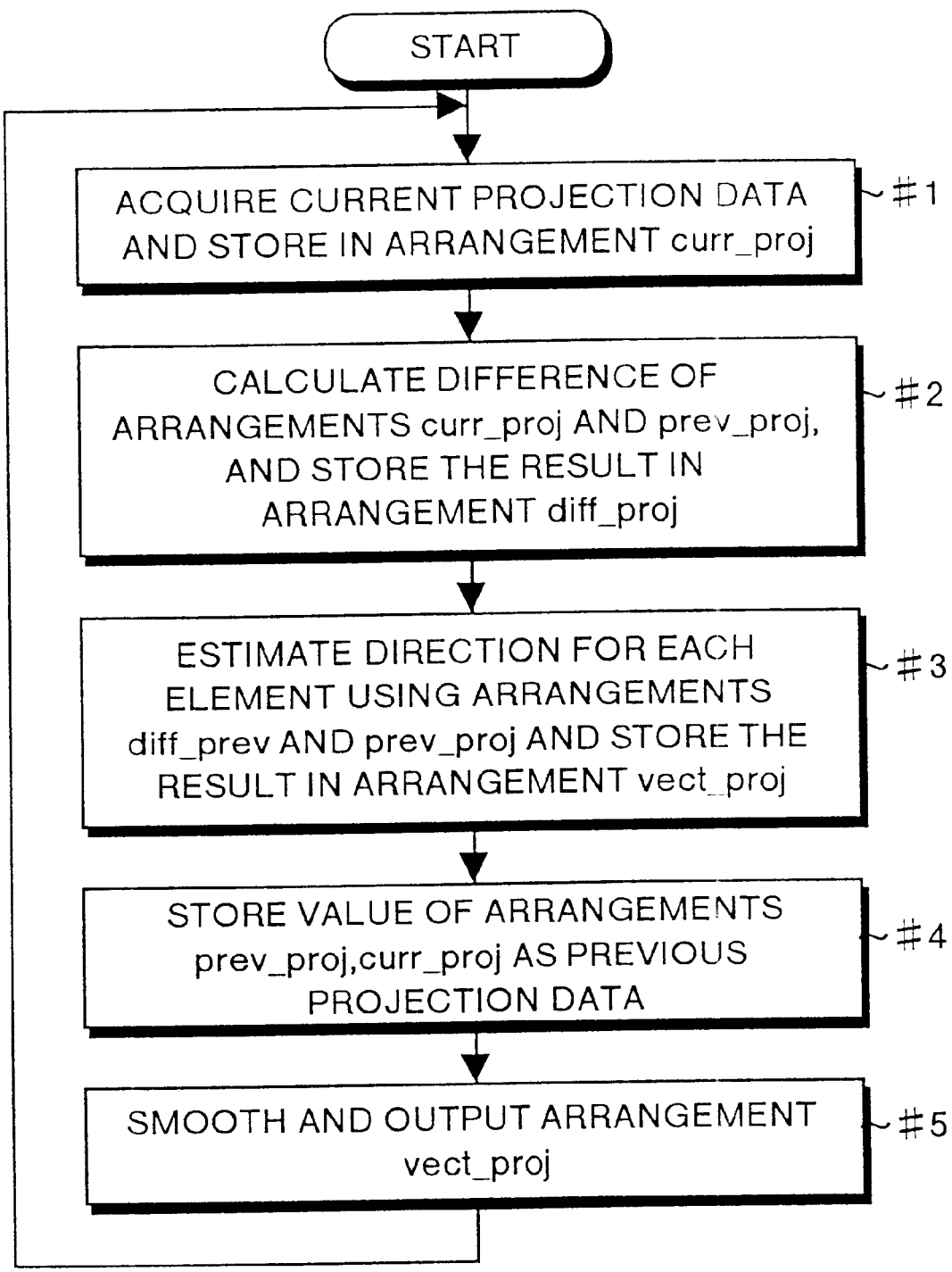

FIG.8A

| あ | か | さ | た | な | は | ま | や | ら | わ |
|---|---|---|---|---|---|---|---|---|---|
| い | き | し | ち | に | ひ | み | い | り | ゐ |
| う | く | す | つ | ぬ | ふ | む | ゆ | る | ゑ |
| え | け | せ | て | ね | へ | め | え | れ | を |
| お | こ | そ | と | の | ほ | も | よ | ろ | ん |

APPARATUS FOR INPUTTING INFORMATION AND COMPUTER PRODUCT

FIELD OF THE INVENTION

The present invention relates to an apparatus for inputting information provided to information equipment having an image sensor. More particularly, this invention relates to apparatus for inputting information capable of inputting and editing information and easily operating equipment such as a portable telephone or a small-sized portable terminal having an image sensor.

BACKGROUND OF THE INVENTION

In recent years, exchange of text information by electronic mail as well as oral speech utilizing information equipment for communication, including a portable telephone and PHS (Personal Handyphone System) found wide applications. Some portable telephones have an image sensor, and picked-up images are expected to be frequently used as the information transmitted in electronic mail. In the near future, a communication unit such as electronic mail using portable communication information equipment having an image sensor are expected to play a crucial role in the exchange of information between individuals.

As a current text input unit for producing sentences for electronic mail using a portable telephone, the ten-keys for inputting the telephone number are mainly used. This device, however, is inconvenient for inputting a long character string. There is also a method as disclosed in Japanese Unexamined Patent Publication No. 09-212281 utilizing a jog dial for selecting a list of telephone number registration. In this method, however, the jog dial must be rotated while manipulating the ten-keys, in particular, when operating the portable telephone in one hand. The use of the jog dial as a text input unit for sentences for electronic mail other than the original object thereof, however, poses the problem of low operability.

Also, as a method of accelerating text input, a method is available in which a character table with a two-dimensional arrangement of Japanese characters is displayed on the liquid crystal screen of a portable telephone, and this table is scrolled by a directional button such as a cross key to select a character. This method, however, is inferior in operability. Another method of scrolling a two-dimensional character table is by using two jog dials in horizontal and vertical directions as disclosed in Japanese Unexamined Patent Publication No. 11-212708. This method, however, requires the operation of two jog dials in addition to the ten-keys, and therefore it is difficult to input the text with one hand and also leads to the problem of low operability. Still another method is disclosed in Japanese Unexamined Patent Publication No. 11-305748 using two acceleration sensors, in which the character table can be scrolled in two dimensions while holding the portable equipment. This method, though having an improved operability for text input, has an increased number of parts and is undesirable from the view point of production cost.

As described above, the conventional apparatus for inputting information constituting a unit for inputting sentences for the electronic mail or like communication using information equipment such as a portable telephone has posed an operability problem. Further, additional parts such as the acceleration sensor may be required increasing production cost.

SUMMARY OF THE INVENTION

It is an object of this invention is to provide an apparatus for inputting information in which the operation of the information equipment having an image sensor by user is calculated as a covered distance using the image picked up by the information equipment, and a symbol table such as a character table is scrolled using the result of calculation, thereby making it possible to input the symbol with a single hand. Another object of the invention is to provide an apparatus for inputting information in which the symbol table is designed to be presented immediately even on a comparatively small display screen of a portable information equipment, thereby improving the symbol input rate and the operability. Still another object of the invention is to provide a recording medium for recording an information input program for inputting a program for the operation described above.

According to one aspect of this invention, there is provided an apparatus for inputting information comprising an image input section for acquiring image information through an image sensor, a motion calculation section for calculating the covered distance from the image information of the image input section, an information selection section for selecting symbol information on a symbol table in operatively interlocked relation with the covered distance calculated by the motion calculation section, and an information displaying section for displaying the symbol table and the symbol information selected.

Further, the information displaying section comprises a symbol area selection unit for selecting an area in the table containing a desired symbol in the information selection section, and a symbol information selection unit for selecting the desired symbol from the area selected by the symbol area selection unit, wherein the symbol table and the selected symbol area and the selected symbol information are displayed on the information display section.

Further, the information selection section has a unit for holding a predetermined covered distance, and selecting the symbol information of the symbol table in operatively interlocked relation with the covered distance calculated by the motion calculation section with a predetermined covered distance added thereto.

Further, the motion calculation section calculates an optical flow using a projection data in the directions along rows and columns of the image information, thereby calculating the covered distance by a motion vector of an X component and a Y component.

Further, the motion calculation section calculates the optical flow using a two-dimensional image data of the image information, and calculates a mean vector thereof as a covered distance.

Further, the information selection section further includes a data base, the information corresponding to the selected symbol information is selected from the data base and displayed on the information display section.

Further, the symbol table is displayed one-dimensionally in the information display section.

Further, a part of the symbol table is displayed in the information display section.

Further, upper and lower ends or left and right ends of a peripheral portion of the symbol table are virtually coupled to each other and displayed in the information display section.

Further, an effect sound output section for outputting an effect sound in accordance with the symbol held in the information selection section is provided.

Further, an image registration section for registering the image information of the image input section is provided.

According to another aspect of this invention, there is provided a readable medium for storing instructions, which when executed by a computer, causes the computer to execute steps of calculating a covered distance from image information, holding a symbol selection area on a symbol table, and updating the symbol selection area in operatively interlocked relation with the covered distance.

Other objects and features of this invention will become apparent from the following description with reference to the accompanying drawings.

BRIEF DESCRIPTION OF THE DRAWINGS

FIG. 4A to FIG. 4C are diagrams for explaining the operation of the motion calculation section according to the first embodiment of the invention.

FIG. 5 is a flowchart for explaining the calculation of an optical flow of the motion calculation section according to the first embodiment of the invention.

FIG. 8A and FIG. 8B are diagrams showing an example of display of the information display section in searching a typical sentence list according to a second embodiment of the invention.

DESCRIPTION OF THE PREFERRED EMBODIMENTS

A first embodiment of the invention will be explained here with reference to the drawings.

Figure 1:
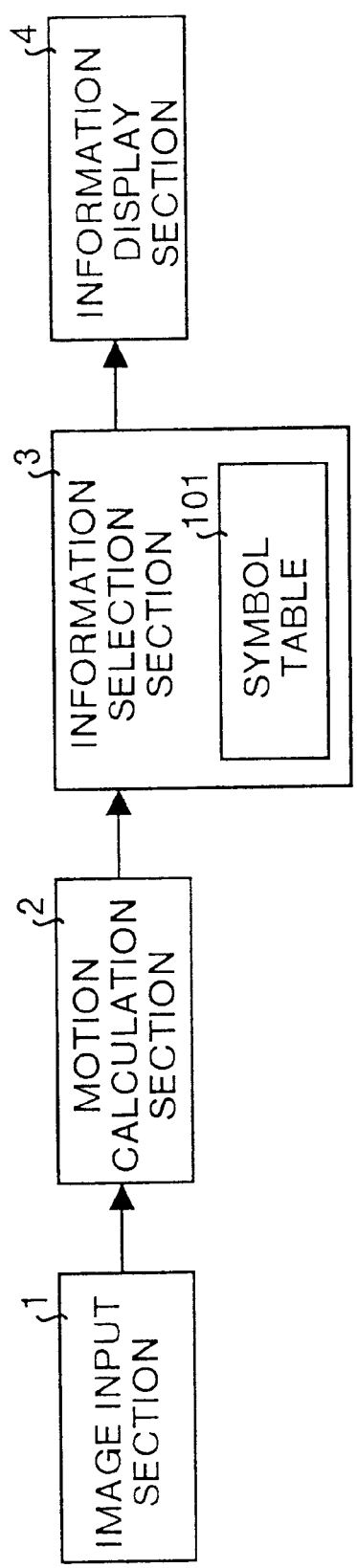
FIG. 1 is a block diagram showing a configuration of an apparatus for inputting information according to a first embodiment of the invention.

FIG. 1 is a block diagram showing a configuration of an apparatus for inputting information according to the first embodiment of the invention and comprises an image input section 1, a motion calculation section 2, an information selection section 3 having a symbol table 101 and an information display section 4.

The basic operation of the apparatus for inputting information will be explained here. The image input section 1 including an image sensor outputs a two-dimensionally picked-up image input from the image sensor (not show) or the result of processing the picked-up image. The motion calculation section 2 calculates a covered distance based on the output data of the image input section 1. The information selection section 3 manages the symbol table 101 configured with text or the like based on the covered distance calculated by the motion calculation section 2, and when the symbol table is displayed two-dimensionally, selects and updates a position of a symbol selection area mapped on the symbol table 101, in operatively interlocked relation with the covered distance. Further, by depressing a button or the like, a desired symbol covered by the symbol selection area is selected, so that the symbol selection area and the selected symbol information are output. The information display section 4 displays the symbol selection area of the output of the information selection section 3, and at the same time displays the symbol table 101 managed by the information selection section 3 and the selected symbol information.

The first embodiment will be explained with reference to the case in which the output data of the image input section 1 is calculated from the total sum of pixel values in two directions along columns and rows of the two-dimensional image (hereinafter referred to as a column projection and a row projection, respectively) picked up by the image sensor. Also, the covered distance of the motion calculation section 2 is expressed by a motion vector, the calculation of which will be explained with reference to the column projection and the row projection using a one-dimensional optical flow algorithm described later. The symbol table of the information selection section 3 is configured with the Japanese characters of hiragana, and updating of the position of the symbol selection area will be explained with reference to the case where the motion vector calculated by the motion calculation section 2 is regarded as a speed. The symbol table display on the information display section 4 is a two-dimensionally arranged Japanese characters of hiragana, in which あ, か, さた, な (read as 'a', 'ka', 'sa', 'ta', and 'na', respectively) are arranged from left to right and あ, い, う, え, お (read as 'a', 'i', 'u', 'e', and 'o', respectively) top to down.

Figure 2:
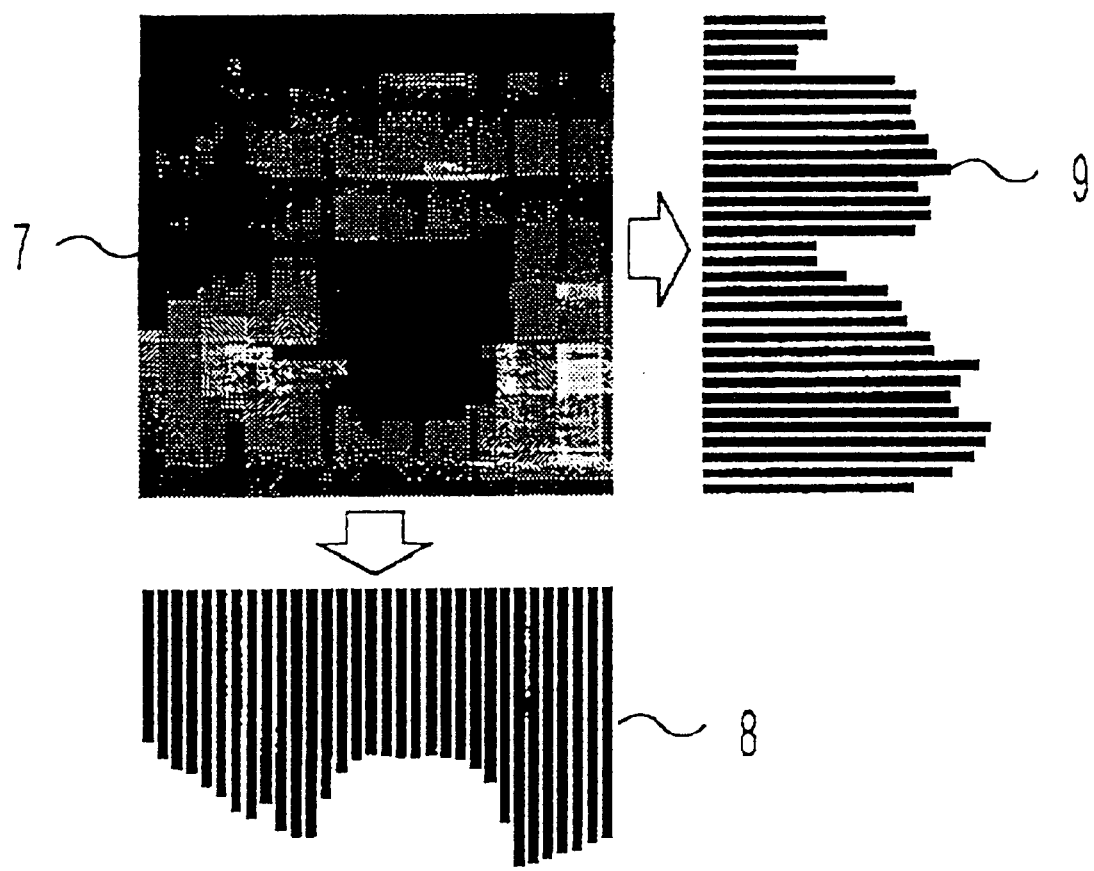
FIG. 2 is a diagram showing an example of an input image of an image sensor and the result of calculation of a row projection and a column projection according to the first embodiment of the invention.

FIG. 2 shows an example of an input image 7 (32×32 pixels) picked up by the image sensor, and an example of a column projection 8 and a row projection 9 providing output data of the image input section 1. The column projection 8 and the row projection 9 are calculated by averaging pixel values along the columns and rows after fetching the image data of the input image 7 into the computer.

Now, the process of calculating the one-dimensional optical flow from the projection data providing the output data of the image input section 1 will be explained with reference to FIG. 3 to FIG. 6 as the operation of the motion calculation section 2.

Figure 3:
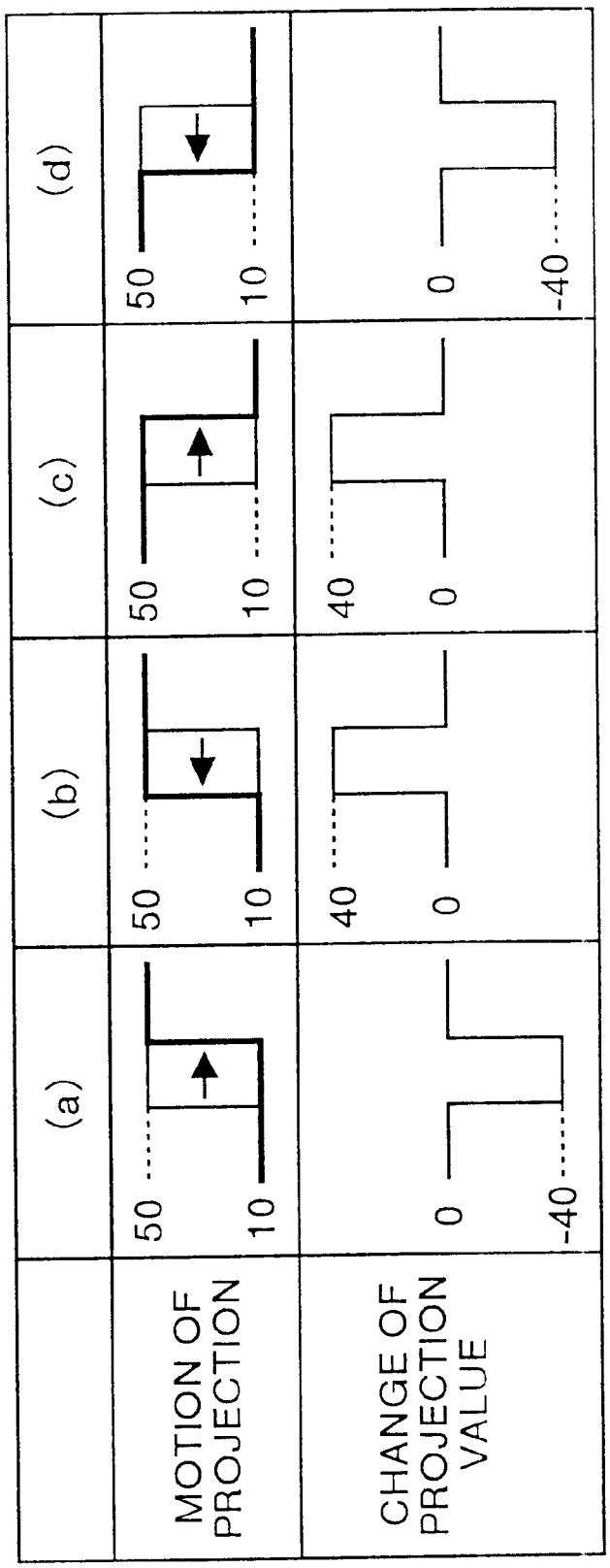
FIG. 3 is a diagram for explaining the operation of a motion calculation section according to the first embodiment of the invention.
Figure 6:
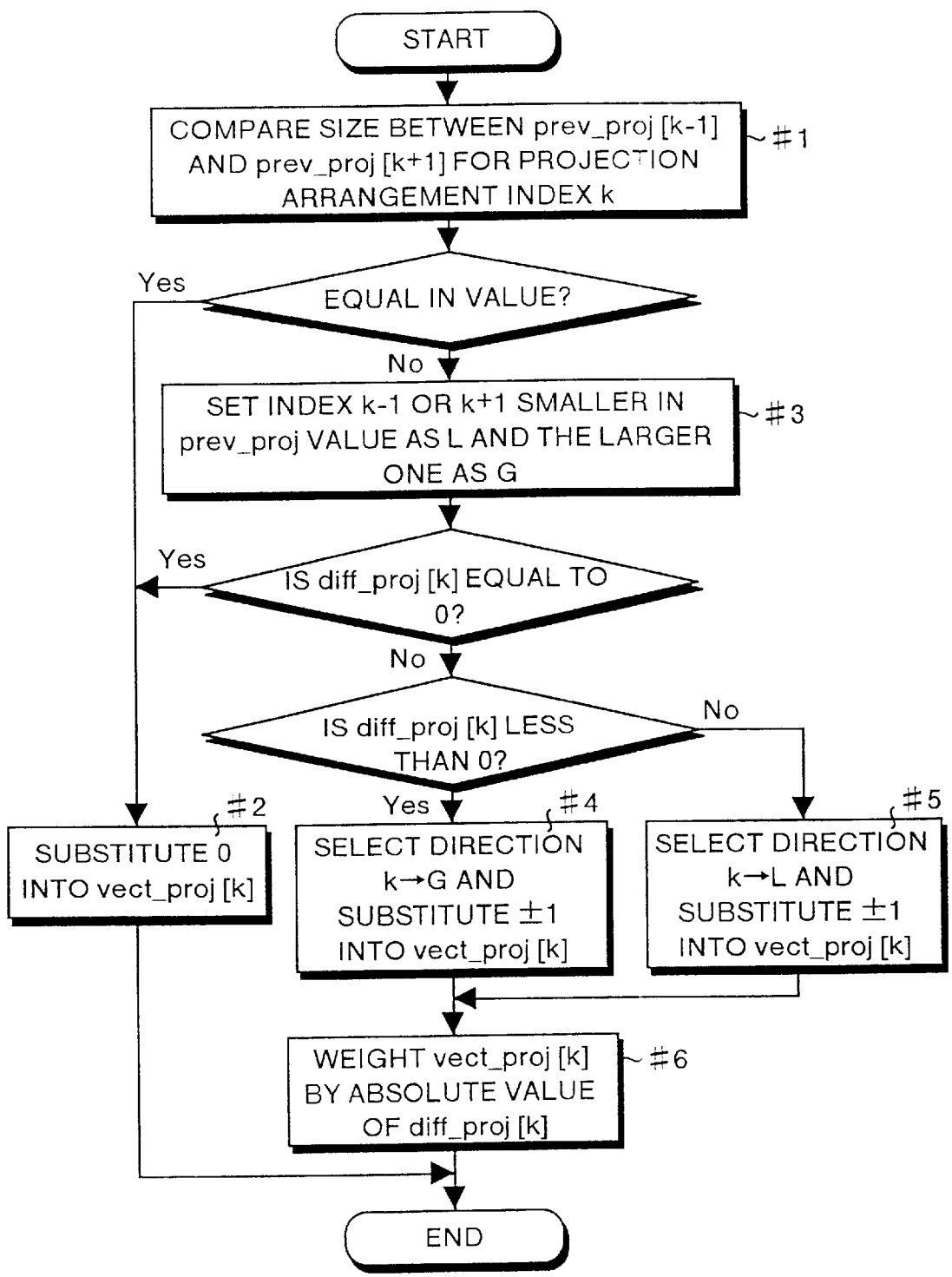
FIG. 6 is a flowchart for explaining an algorithm for estimating a direction for each element in the calculation of the optical flow of the motion calculation section according to the first embodiment of the invention.

FIG. 3 shows a case in which each element of the projection data is regarded as a pixel value in the image and contrast produced by the three adjacent pixel values (hereinafter called a contrast edge) moves rightward and leftward in four different motions. This provides a basic concept for calculating the one-dimensional optical flow.

In FIG. 3, the upper part shows four cases in which the contrast edge (a bright pixel value is indicated as 50 and a dark pixel value as 10; a thin line indicates the previous time and a thick line the current time) moves in the direction of arrow, and the lower part shows a change of a projection value (pixel value) in each case.

From FIG. 3, the following three rules (hereinafter referred to as motion estimation rules) are assumed in estimating the direction of motion at a given pixel position taking the change of the projection value (pixel value) and the motion of the projection into account.

(I) The direction of motion is estimated as 0 (no motion) in the case where the change of the pixel value is zero at a given pixel position or the pixel value changes and the adjacent two pixels have the same pixel value at the previous time point.

(II) In the case where the change of the pixel value is positive at a given pixel position, the direction of motion is estimated toward one of the two adjacent pixels having a smaller pixel value at the previous time point.

(III) In the case where the change of the pixel value is negative at a given pixel position, the direction of motion is estimated toward one of the two adjacent pixels having a larger pixel value at the previous time point.

A simple example will be explained with reference to FIG. 4A to FIG. 4C as to the manner in which the one-dimensional optical flow is obtained from the change in the projection value between the previous time and the current time using the rules described above.

FIG. 4A and FIG. 4B show an example of the projection value having eight elements indicating the projection values at the previous time point and the current time point, respectively. For simplicity's sake, each element is assumed to have a value of 10 to 50. FIG. 4C is a table for specifically explaining the manner in which the motion estimation rule described above is applied for each element arranged in each projection.

First, as to an element #1, a difference between the previous time point and the current time point is 0, and therefore the estimated direction is 0 from the rule (I). As for an element #2, a difference is negative, and therefore the estimated direction is #2 to #3 under the rule (III) (this is also the case with #3 and #4). As for an element #5, the difference is positive. Since #4 and #6 assume the same value for the previous projection, however, the estimated direction is 0 under the rule (I) (this is also the case with #8). As for an element #6, the difference assumes a positive value, and therefore the estimated direction is #6 to #7 under the rule (II) (this is also the case with #7).

As described above, the one-dimensional motion vector (optical flow) of the projection can be calculated by utilizing the value of the previous time projection and the value of the difference projection. The operation of the motion calculation section 3 based on the aforementioned fact is explained with reference to the flowchart of FIG. 5 (the same algorithm is applied to the column projection and the row projection providing the output data of the image input section 1, and therefore these projections are not distinguished in the description that follows).

First, the projection data providing the output data of the image input section 1 is acquired, and stored as the current projection in an arrangement curr_proj (step #1). Then, the difference between the arrangement curr_proj and an arrangement prev_proj storing the previous projection is calculated and the result is stored in an arrangement diff_proj (step #2). Then, using the arrangements diff_proj and prev_proj, the one-dimensional optical flow is calculated for each element, and the result is stored in an arrangement vect_proj (step #3). Then, The arrangement curr_proj is stored as the previous projection in the arrangement prev_proj (step #4). Finally, in order to reduce the noise of the optical flow obtained in step #3, the arrangement vect_proj is smoothed and output (step #5)

The optical flow calculation for each projection element in step #3 is based on the rule of motion estimation described above. The process of calculation for each projection arrangement index k is explained with reference to a flowchart of FIG. 6. First, the magnitude of prev_proj [k−1] and prev_proj. [k+1] are compared with each other (step #1). In the case where the two values are the same, 0 is substituted into vect_proj [k] (step #2) thereby to end the calculation. In the case where the two are not equal to each other, on the other hand, the arrangement with a smaller index k, k+1 is set as L and the arrangement with a larger index is set as G (step #3). Then, the sign of diff_proj [k] is checked, and if it is 0, 0 is substituted in vect_proj [k] (step #2), thereby terminating the calculation. If the sign is negative, on the other hand, the direction k→G is selected (step #4), while in the case where the sign is positive, the direction k→L is selected (step #5). In the case of steps #4 and #5, if G (or L) is k−1, −1 is substituted into vect_proj [k], while if G (or L) is k+1, 1 is substituted into vect_proj [k]. Further, the value of vect_proj [k] is weighted by the absolute value of diff_proj [k] (step #6), thereby terminating the calculation.

Furthermore, for the optical flow calculated from the column projection and the row projection as described above, the average vectors constituting them are assumed to be X component and Y component, respectively. Then, the motion vector is obtained as the covered distance providing the output data of the motion calculation section 2.

Figure 7A:
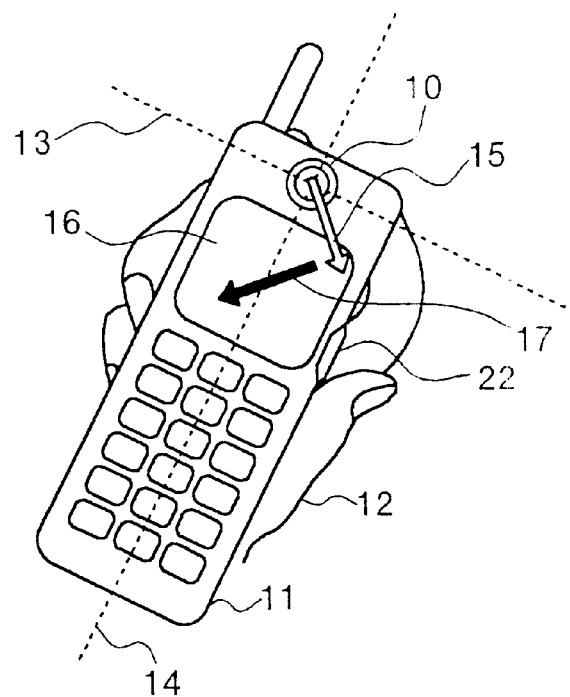
FIG. 7A and FIG. 7B are diagrams for explaining the operation of an information selection section and an information display section according to the first embodiment of the invention.

Now, the operation of the information selection section 3 and the information display section 4 will be explained with reference to FIG. 7A and FIG. 7B. FIG. 7A is a diagram showing the operation of inputting a text by manipulating a portable telephone 11 having an image sensor 10 with a human hand 12. An explanation will be given with reference to the case in which the portable telephone 11 is moved around the image sensor 10 in the direction of a vector 15 relative to a horizontal axis 13 and a vertical axis 14 of the portable telephone 11. In this case, a motion vector 17 calculated by the motion calculation section 2 is displayed as it is on a display screen 16 of the portable telephone 11 as indicated by arrow, and the vector 17 is horizontally opposite to the vector 15 in view of the fact that the direction of the image sensor 10 and the direction in which the user watches the screen 16 have a relation of a mirror image. Therefore, when operating the display item on the display screen 16, the vector 17 is horizontally reversed.

Figure 7B:
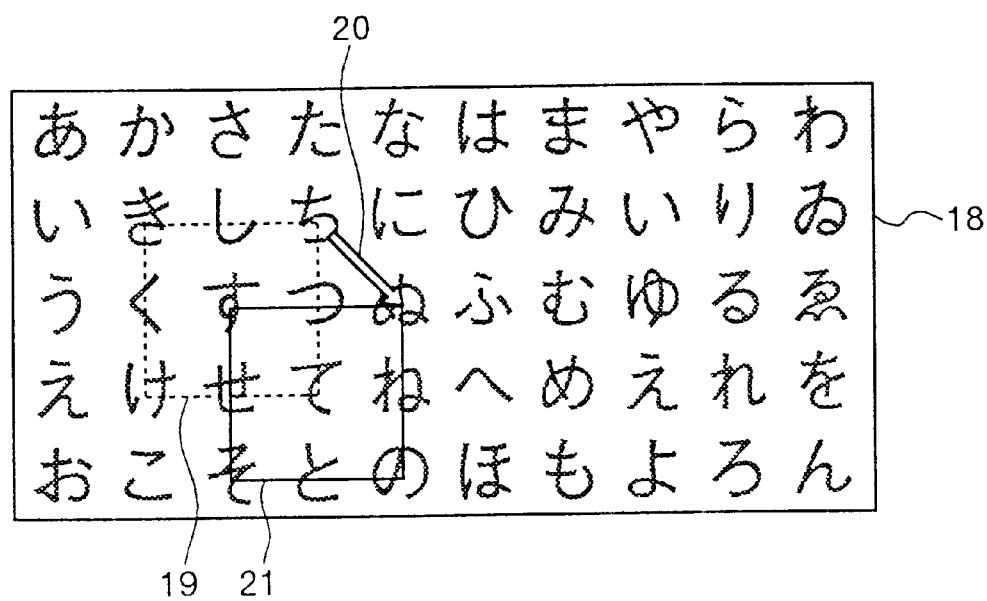

Numeral 18 in FIG. 7B designates a character table showing the Japanese characters of hiragana displayed by the information display section 4 on the display screen 16 in FIG. 7a. Numerals 19 and 21 designate character select rectangular areas held by the information selection section 3. The position of the rectangular area 19 is renewed and moved to the rectangular area 21 by a vector 20 horizontally in reverse direction of the motion vector calculated by the motion calculation section 2. By continuing this process, the user of the portable telephone can move the character select rectangular area up to the position of the character desired by him. With the arrival of the character select rectangular area at the position covering the desired character, the user depresses a character select operation button 22 mounted on the body of the portable telephone 11 of FIG. 7A. In the case where the rectangular area is at position 21, for example, て (read as 'te') of hiragana is selected and constitutes an output data of the information selection section 3. Each time the symbol information selection button 22 is depressed, the information display section 4 displays the character output from the information selection section 3 as a character string, so that the user can produce the contents of the mail on the display screen of the portable telephone.

The foregoing description concerns the case in which the motion vector calculated by the motion calculation section 2 is moved from the position of the rectangular area 19 by the vector 20 in horizontally reverse direction. As an alternative, the motion vector calculated by the motion calculation section 2 may be used as it is and the character table 18 is moved while at the same time displaying the rectangular area 19 fixedly.

The motion vector is calculated from a picked-up image as described above, the symbol table configured with characters is managed, the symbol selection area mapped on the two-dimensional display screen of the symbol table is held, and further the symbol selection area is renewed by the motion vector. This whole procedure is realized by the select information input program, which is provided in a form recorded in a recording medium.

As described above, according to this embodiment, the motion vector is calculated with the manual operation of the user as the covered distance using the result of the image processing obtained from the picked-up image of the image sensor mounted on the portable telephone or the like, and by use of this motion vector, a symbol like a character is selected from the symbol table and used as a text input unit. Thus, the text input operation can be performed while holding the portable equipment, and therefore as compared with the case where a jog dial or the like is used, the operability is improved. In this way, it is possible to use an image sensor which is most probably mounted as a standard equipment on the future portable equipment. Thus, no additional component parts like the acceleration sensor is needed.

Also, the apparatus for inputting information according to this embodiment is not limited to the application as a portable communication equipment, but can provide a text input unit high in operability usable without the keyboard for the interface of the gaming machine or the program selection of the digital TV.

This embodiment represents the case in which the average of the pixel values arranged along the columns and the rows of a picked-up two-dimensional image are calculated for a column projection and a row projection in the image input section 1. Alternatively, the artificial retina providing an image sensor described in the magazine "Nature, Artificial Retina—Fast, Versatile image processors", Vol. 372, No. 6502, pp.197–198, 1994, and Japanese Patent Application Laid-Open No. 10-093358 may be used, in which the artificial retina LSI providing an image sensor outputs the column projection and the row projection directly from the input image.

Further, according to this embodiment, in calculating the motion vector as a covered distance in the motion calculation section 2, the optical flow configured with a one-dimensional vector is calculated from the projection data providing the output data of the image input section 1, after which the mean vector is calculated for each of the column projection and the row projection, so that the motion vector is calculated as X and Y components, respectively. By using the calculation of the optical flow configured with a two-dimensional vector described in Japanese Patent Application Laid-Open No.4-241077, however, the optical flow is calculated directly from the two-dimensional image data without the intermediary of the projection data. Then, it is possible to obtain the same motion vector as if the projection data is used, by calculating the mean vector.

Also, instead of using the optical flow for calculation of the motion vector, the motion vector can be alternatively calculated using a calculation formula based on what is called the correlation calculation.

Further, according to this invention, the symbol table managed by the information selection section 3 is indicated as the Japanese characters of hiragana. A similar function can be realized, however, also with katakana or alphabets. Also, in the example described above, the velocity of the motion vector calculated in the motion calculation section 2 is reflected in renewing the position of the symbol selection area in the information selection section 3, i.e. the position of the symbol selection area is not updated if the motion vector is 0. As an alternative, the motion vector is reflected as an acceleration, in which case a predetermined vector of velocity is held in the information selection section 3, and is added to the motion vector of this motion calculation section 2. In this way, the symbol selection area is renewed even when the motion vector is 0, with the result that the hand need not be kept moving for character selection, thus alleviating the burden on the user manipulating the portable equipment. Especially in this case, the position of the symbol selection area is always renewed without user operation. Once the vector of velocity held in the information selection section 3 is attenuated at a predetermined rate for the purpose of stopping the symbol selection area, the operability is improved.

Further, according to this embodiment, the Japanese characters of hiragana あ, か, さ, た, な, ..., わ (read as 'a', 'ka', 'sa', 'ta', 'na', ..., 'wa' respectively) are arranged from left to right and あいうえお (read as 'a', 'i', 'u', 'e', and 'o', respectively) top to down in the information display section 4. Nevertheless, these characters can be arranged in reverse order as desired by the user.

A second embodiment will be explained below with reference to FIG. 8A and FIG. 8B.

The apparatus for inputting information according to this embodiment is configured in a similar manner to the first embodiment. According to this embodiment, the information selection section 3, in addition to the character input mode in the fist embodiment, has a data base search mode for managing the data base of sentences and images, selecting a symbol such as a character from the symbol table, and searching the data base using the particular symbol. In this mode, not only the selection of the items for the data base but also the addition or correction of the items is possible. By the way, in the description of the invention that follows, it is assumed that the information selection section 3 functions as a data base search mode and manages the data base of the typical sentences configured with the mixed sentences of kanji and kana that can be set in order with hiragana, that the information display section 4 displays the character table 18 configured with the Japanese characters of hiragana of FIG. 8A arranged in the same manner as in the first embodiment, and that a symbol selection area 23 held by the information selection section 3 is located at a position such that it surrounds the character す (read as 'su').

Under this condition, assume that the user depresses the symbol information selection button. The hiragana す (read as 'su') is selected, and the information selection section 3 sends an instruction to the information display section 4 to display a list of sentences starting with す (read as 'su') in the typical sentence and the portions before and after the typical sentence in the typical sentence data base under its management. FIG. 8B is an example of such a typical sentence list displayed, in which the typical sentence defined by a rectangle 29 designates the candidates for the typical sentence starting with す (read as 'su'). The user, while watching this, selects the desired typical sentence from among the candidates. As a method of selection, the numbers on the ten-keys unique to the portable telephone may be used or, as another method, the symbol information selection button used for character selection is kept depressed to cyclically display the candidates, while releasing the button, the desired typical sentence is selected.

As described above, according to this embodiment, the information selection section 3, in addition to the symbol select function described in the first embodiment, can manage the data base of sentences and images and can select the data base item according to the selected character symbol, and therefore can produce a long sentence efficiently as compared with when a single character is input, thereby improving the efficiency for producing a mail using the portable telephone.

According to this embodiment, the data base managed in the information selection section 3 is such that the typical sentence data base configured with a mixed sentence of kanji and kana are searched with a single hiragana character to select the desired typical sentence. The method of search, however, is not limited to the typical sentence with a character, but a different data base such as an image data base with comments attached thereto can be searched or items selected in similar manner.

A third embodiment of the invention will be explained below with reference to FIG. 9A to FIG. 11C.

The configuration of the apparatus for inputting information according to this embodiment is similar to that of the first embodiment. According to this embodiment, unlike the first or second embodiment, the information display section 4 displays the symbol table in three ways, i.e. one-dimensional display, partial display and cyclical display. By the way, in the description of this embodiment that follows, a character table configured with the Japanese characters of hiragana is used like in the first and second embodiments.

Figure 9A:
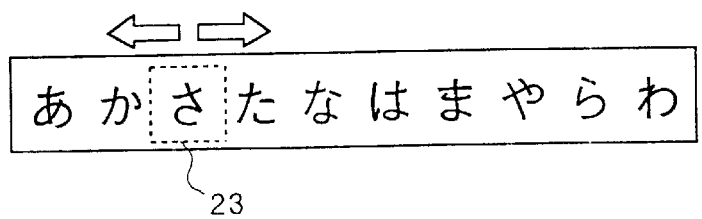
FIG. 9A to FIG. 9C are diagrams for explaining a one-dimensional display of a character table of an information display section according to a third embodiment of the invention.
Figure 9B:
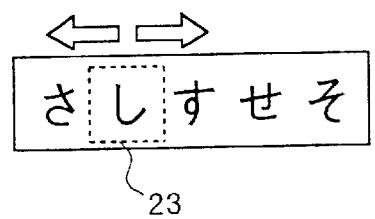
Figure 9C:
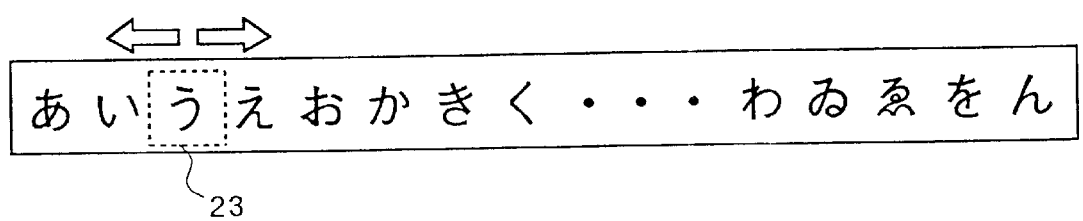

First, reference is made to the one-dimensional display of the symbol table in FIG. 9A to FIG. 9C. FIG. 9A and FIG. 9B show an example of a method of one-dimensional display of the symbol table. In FIG. 9A, only the characters belonging to あ (read as 'a') are displayed. In this case, unlike the first or second embodiment, the character table is one-dimensional and therefore the symbol selection area 23 is moved only in two directions, and so is the operation of the user who moves his hand only in two directions, say, rightward or leftward, to select a character from the あ (read as 'a') group. Assume, for example, that し (read as 'shi') is to be selected from the Japanese characters of hiragana (see FIG. 9C). In such a case, first, さ (read as 'sa') is required to be selected, and therefore the user moves his hand rightward and leftward to set the symbol selection area 23 at a position covering the character さ (read as 'sa'). At this time point, the character selection button 22 is depressed. Then, the display on the symbol table changes to the さ (read as 'sa') group, so that as shown in FIG. 9B, the さ (read as 'sa') group is one-dimensionally displayed horizontally. Further, in order to set the symbol selection area 23 in position, the user moves the hand horizontally again, thereby making it possible to select the character し (read as 'shi'). In other words, unlike in the first and second embodiments, the user can select a character by moving the hand only in two horizontal directions.

Another method of one-dimensional display of the symbol table is to arrange all the characters of the Japanese characters of hiragana in one line as shown in FIG. 9C. Also in this method, the user moves his hand horizontally and moves the symbol selection area 23 to a position covering the desired character to select the particular character.

Figure 10A:
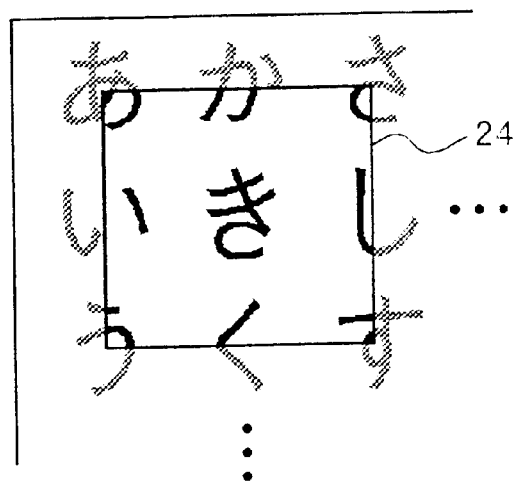
FIG. 10A to FIG. 10D are diagrams for explaining partial display of the character table of the information display section according to the third embodiment of the invention.

The partial display of the symbol table will be explained with reference to FIG. 10A to FIG. 10D. FIG. 10A is a diagram in which only the portion covered by the partial display area 24 is displayed on the information display section 4 among the whole Japanese characters of hiragana similar to that of the first embodiment. According to the first embodiment, the user moves this hand to move the symbol selection area on the character table for selecting a character. In the present embodiment, on the other hand, the character table is moved with respect to the partial display area 24 to select a character. For example, the character き (read as 'ki') located nearest to the center of the partial display area 24 is used as a base. In this way, the character table can be displayed even in a comparatively small display area like in the portable telephone for character selection.

Figure 10B:
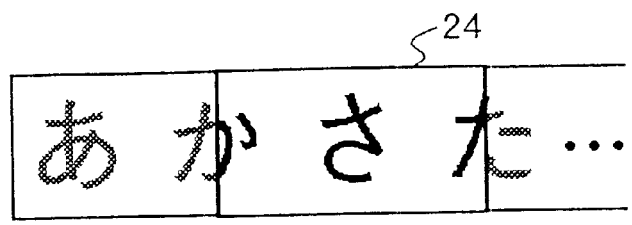
Figure 10C:
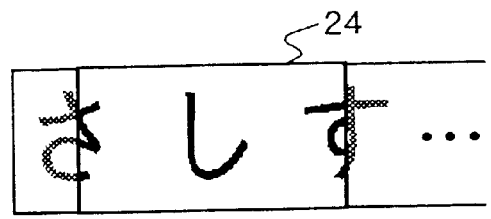

Also, in the one-dimensional display of the character table as shown in FIGS. 9A and 9B, the whole symbol is not displayed but the area where the symbol table is visible is limited to the partial display area 24 as shown in FIGS. 10B and 10C, thereby making it possible to display the character table even in a small display area.

Figure 10D:
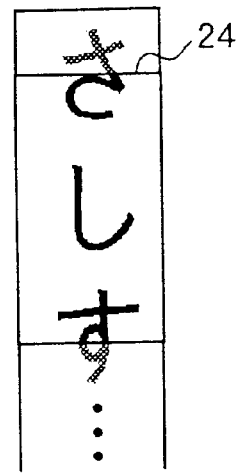

In relation to FIG. 10C, the character table can be shown while being moved vertically as shown in FIG. 10D. In such a case, taking the case of FIG. 10B into consideration, the characters あ, か, さ, た, な, . . . , わ (read as 'a', 'ka', 'sa', 'ta', 'na', . . . , 'wa' respectively) can be selected by horizontal movement while the characters of あ, い, う, え, お (read as 'a', 'i', 'u', 'e', and 'o', respectively) can be selected by vertical movement, whereby the operation equivalent to the first embodiment is possible without displaying the whole character table.

A round display of the symbol table will be explained with reference to FIG. 11A to FIG. 1C. As an example, consider the case in which the first and last characters of あ, か, さ, た, な, . . . , わ (read as 'a', 'ka', 'sa', 'ta', 'na', . . . , 'wa' respectively) shown in FIG. 9A, i.e. あ (read as 'a')and わ (read as 'wa') are virtually coupled so that the characters are arranged in dial, and the user manipulates the table to rotate clockwise or counterclockwise. In this case, too, the partial display area 24 is included for character selection. This facilitates the movement between characters on the character table. For example, the movement from あ (read as 'a') to わ (read as 'wa') or the reverse way can be increased in speed, and the selection of an arbitrary character is made possible.

Figure 11A:
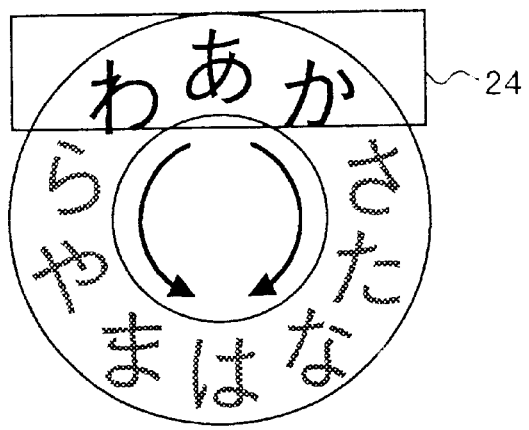
FIG. 11A to FIG. 11C are diagrams for explaining cyclical display of the character table of the information display section according to the third embodiment of the invention.
Figure 11B:
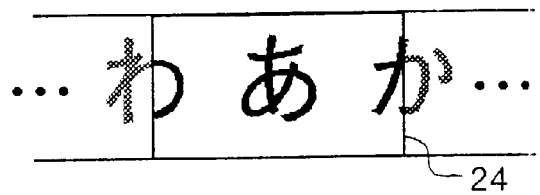

As another example of the round display of the symbol table, the characters are arranged in belt as shown in FIG. 11B, and the table is scrolled horizontally with the horizontal manipulation of the user, so that the character appearing in the neighborhood of the center of the partial display area 24 is selected. In this way, the character selection equivalent to that of FIG. 11A is made possible.

Figure 11C:
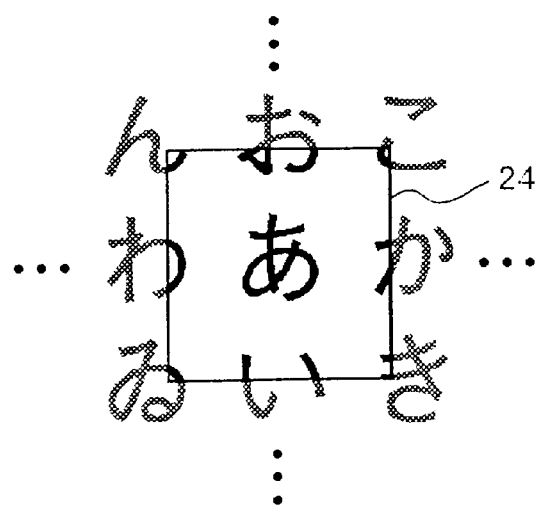

FIG. 11A and FIG. 11B show examples of one-dimensional round display of the symbol table. As another example, as shown in FIG. 11C, the upper and lower peripheral portions and the right and left peripheral portions of the Japanese characters of hiragana in the first embodiment are virtually coupled to each other. In this case, too, the partial display area 24 is included, and the character table virtually presented is scrolled by the user manipulation. In this way, the character selection like in the first embodiment is realized, and in addition, the movement between characters such as from あ (read as 'a') to わ(read 'wa') or from あ (read as 'a') to お (read as 'o') can be increased in speed.

As described above, according to this embodiment, the information display section 4 is designed to have the three ways of symbol table display, including the one-dimensional display, the partial display and the cyclical display. The user, therefore, only moves his hand horizontally and the user operation is simplified. The partial display, on the other hand, permits the symbol table to be displayed in a small area of the portable telephone. Also, the cyclical display increases the speed of movement from one character to another.

Figure 12:
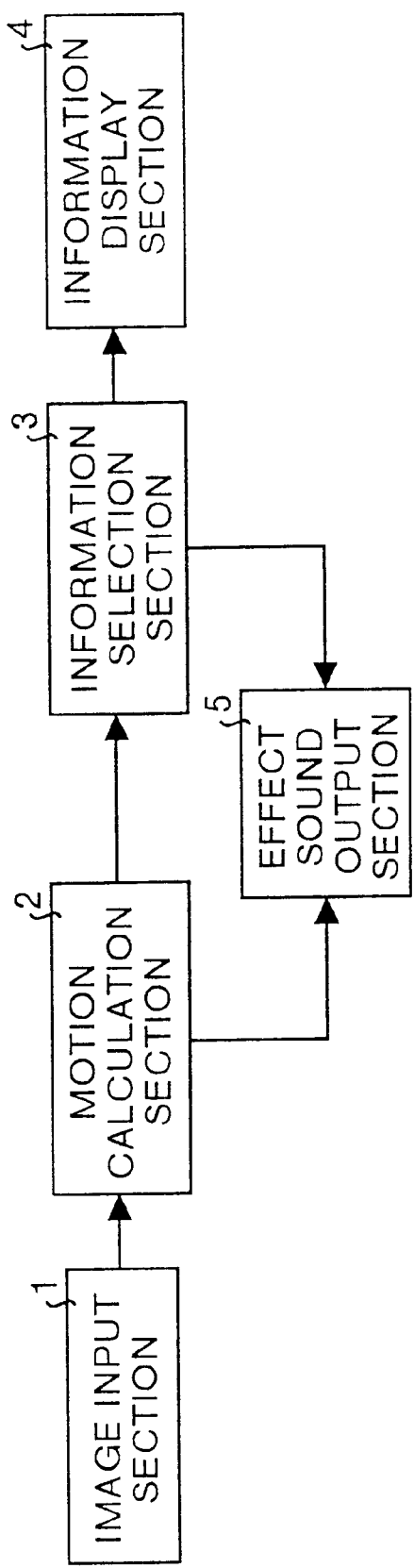
FIG. 12 is a block diagram showing a configuration of an apparatus for inputting information according to a fourth embodiment of the invention.

A fourth embodiment of the invention will be explained below. The configuration of the select apparatus for inputting information according to this embodiment, in addition to the configuration of the first embodiment, has an effect sound output section 5 as shown in FIG. 12. The effect sound output section 5 according to this embodiment will be explained with reference to the case shown in FIG. 13A and FIG. 13B in which an effect sound is produced each time the direction of the motion vector calculated by the motion calculation section 2 changes to pass each symbol or the symbol selection area held by the information selection section 3 passes each symbol on the symbol table.

Figure 13A:
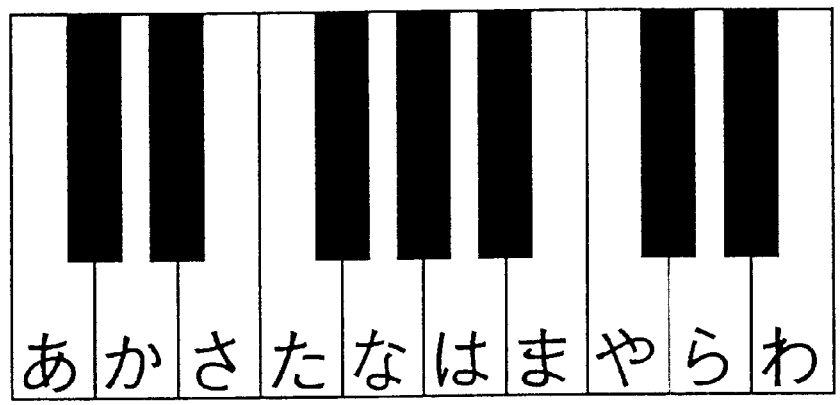
FIG. 13A and FIG. 13B are diagrams for explaining the operation of an effect sound output section according to the fourth embodiment of the invention.

FIG. 13A shows the scale of the effect sound assigned to each symbol represented by the keyboard of the piano as the あ, か, さ, た, な,... わ (read as 'a', 'ka', 'sa', 'ta', 'na', ..., 'wa' respectively) column shown in FIG. 9A moves horizontally with the horizontal movement of the symbol selection area 23 in response to the user operation. According to this method, the user can know which symbol is selected from あ, か, さ, た, な,... わ (read as 'a', 'ka', 'sa', 'ta', 'na', ..., 'wa' respectively) column without watching the display screen. If あ (read as 'a') is selected, for example, selection of the following あ, い, う, え, お (read as 'a', 'i', 'u', 'e', and 'o', respectively) produces a similar effect sound thereby making it possible to select a character.

Figure 13B:
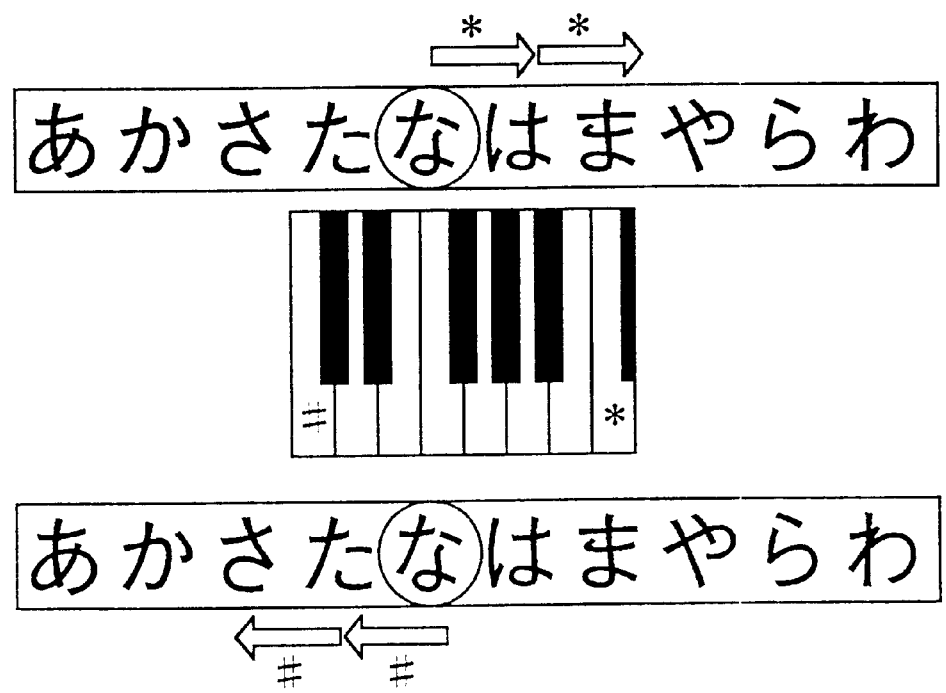

Another method of using the effect sound for character selection is shown in FIG. 13B, in which without assigning the scale to each symbol, the user counts the number of times an effect sound of a different scale is produced according to the direction of the user manipulation each time a particular symbol is passed from the initial position of the symbol selection area. In this way, the position of the character to be selected can be determined. In the case under consideration, the initial position is set to な (read as 'na'), and when moving rightward of な (read as 'na'), the scale of the keyboard indicated by asterisk symbol is output in a pulse with the passage of each symbol, while in leftward movement, the scale with a sharp symbol is output in similar fashion.

As another alternative, the selected character can be announced by a synthesized sound. The advantage of this method is great for visually handicapped persons.

As described above, according to this embodiment, in addition to the features of the first embodiment, the provision of an effect sound output section 5 makes it possible to input a character without watching the display screen. Thus, even a visually handicapped person can input characters using a portable telephone, and the efficiency of character input is improved also for physically healthy persons.

Instead of assigning the あ, か, さ, た, な, ..., わ (read as 'a', 'ka', 'sa', 'ta', ..., 'na', 'wa' respectively) columns with the effect sounds of low to high scales in that order as shown in FIG. 13A according to this embodiment, a high scale can be assigned to あ (read as 'a') and a low one to わ (read as 'wa') to obtain the same effect. Also, while assigning the same scale to each character, a different tone (the sound of the piano or horn, for example) can be assigned.

Figure 14:
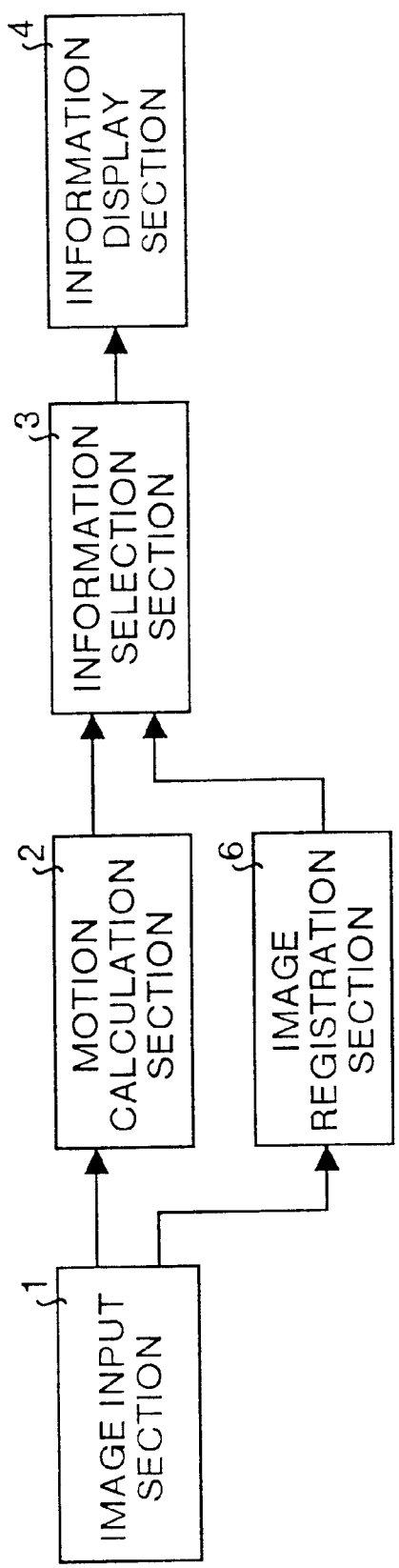
FIG. 14 is a block diagram showing a configuration of an apparatus for inputting information according to a fifth embodiment of the invention.
Figure 15:
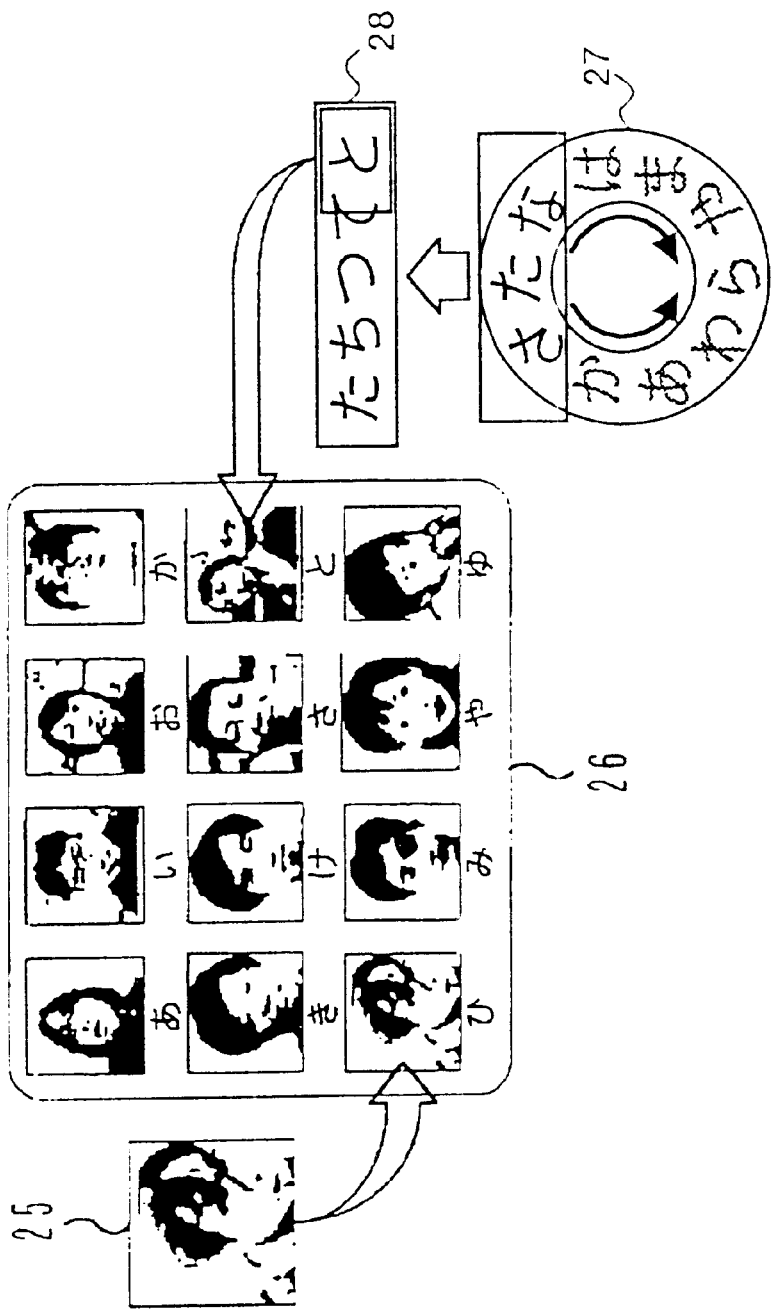
FIG. 15 is a diagram for explaining the operation of an image registration section according to the fifth embodiment of the invention.

A fifth embodiment of the invention will be explained here. The configuration of the apparatus for inputting information according to this embodiment, as shown in FIG. 14, in addition to the configuration of the first embodiment, has an image registration section 6. According to this embodiment, the image registration section 6 registers the image picked up by the image sensor of the image input section 1 on the symbol table managed by the information selection section 3, as an image file with a hiragana index attached thereto. After registration, like the character selection, the desired image file is selected based on the particular index, as will be explained below with reference to FIG. 15.

First, the image input section 1 picks up an image 25 to be registered, which image is sent to the image registration section 6. Upon receipt of the image, the image registration section 6 attaches an index ひ (read as 'hi') in hiragana to the image 25, and registers it in the symbol table 26 having an image file managed by the information selection section 3. After that, the user checks a registered image list, and in the case of selecting an image having an index of と (read as 'to'), for example, returns to the hiragana select operation. Then, he selects た (read as 'ta') from the あ, か, さ, た, な, ..., わ (read as 'a', 'ka', 'sa', 'ta', 'na', ..., 'wa' respectively) group in the form of display 27 shown in FIG. 11, and then selects と (read as 'to') from the た, つ, て, て, と (read as 'ta', 'tsu', 'te', and 'to' respectively) group in a display form 28 shown in FIG. 9B, thus making it possible to select the desired image file.

In this way, according to this embodiment, in addition to the feature of the first embodiment, the provision of the image registration section 6 makes it possible to register the image using the image sensor, and by referring to the index attached to the image to be registered, an image can be selected in the same manner as a character. Thus in such a case where the user wants to attach an image file to the electronic mail produced by the portable telephone, the efficiency of file selection is improved for producing a mail with the portable telephone.

As described above, in the apparatus for inputting information according to one aspect of the invention, the motion of the hand of the user is calculated as the covered distance using the result of image processing obtained from the image picked up by the image sensor mounted in the portable telephone, and using this covered distance, a symbol such as a character is selected from the symbol table as means for inputting a character. Therefore, the user can perform the character input operation with one hand while holding the portable equipment, as compared with when using the jog dial, the operability is improved. Also, by use of an image sensor which is most likely to be employed as a standard equipment in the future portable equipment, the additional component parts such as an acceleration sensor are eliminated.

Further, the information selection section includes a symbol area selection unit for selecting an area in the table including the desired symbol, and a symbol information selection unit for selecting the desired symbol from the area selected by the symbol area selection unit, wherein the symbol table, the symbol area and the selected symbol information are displayed on the information display section for an improved operability.

Further, the information selection section holds the predetermined covered distance, which is added to the covered distance calculated in the motion calculation section, and thus selects the symbol information of the symbol table in operatively interlocked relation with the covered distance with the predetermined covered distance added thereto, thereby improving the operability.

Further, the motion calculation section calculates an optical flow using the projection data along rows and columns of the image information, and calculates the covered distance from the motion vector having X and Y components. Thus, a comparatively simple image sensor is configured, and an apparatus for inputting information having an internal image sensor can be configured without adding new parts.

Further, the motion calculation section calculates an optical flow using the two—dimensional image data of the image information, and from the mean vector thereof, calculates the covered distance. Therefore a comparatively simple image sensor can be configured. Also, in the apparatus for inputting information having the image sensor built therein, a new part is not required to be added.

Further, the information selection section 3 manages the data base of the typical sentence and can select the desired item by a selected symbol such as a character, and therefore a long sentence can be efficiently produced as compared with a single character input. Thus, the efficiency of creation of mails on the portable telephone can be improved.

Further, the information display section 4 displays a' symbol table one-dimensionally, and therefore the user operation is only in two directions, for example, the horizontal movement and is simplified. Thus the efficiency of creation of mails on the portable telephone can be improved.

Further, the information display section 4 partially displays the symbol table, and therefore the symbol table can be displayed even in a small display screen of the portable telephone or the like. Thus the character table can be immediately grasped even within a small space, with the result that the mail and the like communication sentence using the portable telephone can be improved.

Further, the information display section 4 operates based on the cyclical display virtually coupling the vertical or horizontal peripheral portions of the symbol table. Therefore, the movement between two characters at the ends of the character table can be increased in speed, such as from あ (read as 'a') to わ (read as 'wa') or from あ (read as 'a') to お (read as 'o'), which are located at the ends far from each other in the display method other than cyclical. Thus, the production efficiency of the mail and other communication sentences using the portable telephone can be improved.

Further, the effect sound output section 5 is provided so that character input is possible without watching the display screen. Thus, even a visually handicapped person can input characters using the portable telephone, thereby widening the range of the prospective users. Also for those persons not visually handicapped, there is no need to always watch the screen, and therefore the character input efficiency is improved, thereby improving the production efficiency of mail or other communication sentences using the portable telephone.

Further, the image registration section 6 is provided, and therefore the image registration using the image sensor is possible. Thus, by referring to the index attached to the image to be registered, an image can be selected in the same manner as a character. In the case where it is desired to attach an image file to the electronic mail or the like produced by the portable telephone or the like, the file selection efficiency for preparation of a mail or other communication sentences produced by the user in the portable telephone is improved.

The readable medium for storing instructions, which when executed by a computer, causes the computer to execute the step of calculating the covered distance of the picked-up image, the step of holding the symbol selection area on the symbol table and the step of renewing the symbol selection area according to the covered distance, and therefore the apparatus for inputting information can be reduced in size in a form suitable for volume production.

Furthermore, in the apparatus for inputting information according to the invention, a character input unit high in operability without a keyboard is provided for the interface of arcade machines or the program selection of the digital TV as well as for applications to the portable telephone.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for inputting information comprising:
   an image input section having an image sensor, the image sensor acquiring image information;
   a motion calculation section which calculates a distance of movement of input image information acquired by the image input section;
   a converting section that converts the distance of movement of the input image information into a distance of movement of the apparatus;
   an information selection section which selects symbol information from a symbol table in operatively interlocked relation with the distance of movement of the apparatus output from the converting section; and
   an information display section for displaying the symbol table and the symbol information selected.

2. The apparatus for inputting information according to claim 1, wherein said information selection section includes:
   a symbol area selection unit which selects an area in a table containing a desired symbol; and
   a symbol information selection unit which selects the desired symbol from the area selected by said symbol area selection unit, wherein the symbol table, the area selected, and the symbol information selected are displayed on said information display section.

3. The apparatus for inputting information according to claim 1, wherein said information selection section holds a covered distance and selects the symbol information in the symbol table in operatively interlocked relation with the distance of movement of the apparatus calculated by said motion calculation section, in addition to the covered distance.

4. The apparatus for inputting information according to claim 1, wherein said motion calculation section calculates an optical flow using projection data in directions along rows and columns of the image information, and thereby calculates the distance of movement of the input image information based on a motion vector having an X component and a Y component.

5. The apparatus for inputting information according to claim 1, wherein said motion calculation section calculates an optical flow using two-dimensional image data of the image information, and calculates a mean vector of the two-dimensional image data as a covered distance.

6. The apparatus for inputting information according to claim 1, wherein said information selection section further includes a data base, selects information corresponding to the symbol information selected from the data base, and displays the information on said information display section.

7. The apparatus for inputting information according to claim 1, wherein said information display section displays the symbol table one-dimensionally.

8. The apparatus for inputting information according to claim 1, wherein said information display section displays a part of the symbol table.

9. The apparatus for inputting information according to claim 1, wherein said information display section displays upper and lower ends or left and right ends of peripheral portions of the symbol table virtually coupled to each other.

10. The apparatus for inputting information according to claim 1, further comprising a sound effect output section which produces a sound effect in accordance with a symbol held in said information selection section.

11. The apparatus for inputting information according to claim 1, further comprising an image registration section which registers the image information of said image input section.

12. A readable medium for storing instructions, which, when executed by a computer, causes the computer to acquire image information, calculate a distance of movement of input image information, convert the distance of movement of the input image information into a distance of movement of the computer, hold a symbol selection area on a symbol table, and update the symbol selection area in operatively interlocked relation with the distance of movement of the computer.

* * * * *